J. E. BLAIN, DEC'D.
E. H. BLAIN, ADMINISTRATRIX.
BEARING WEAR SIGNAL DEVICE.
APPLICATION FILED OCT. 13, 1919.
1,361,000.
Patented Dec. 7, 1920.
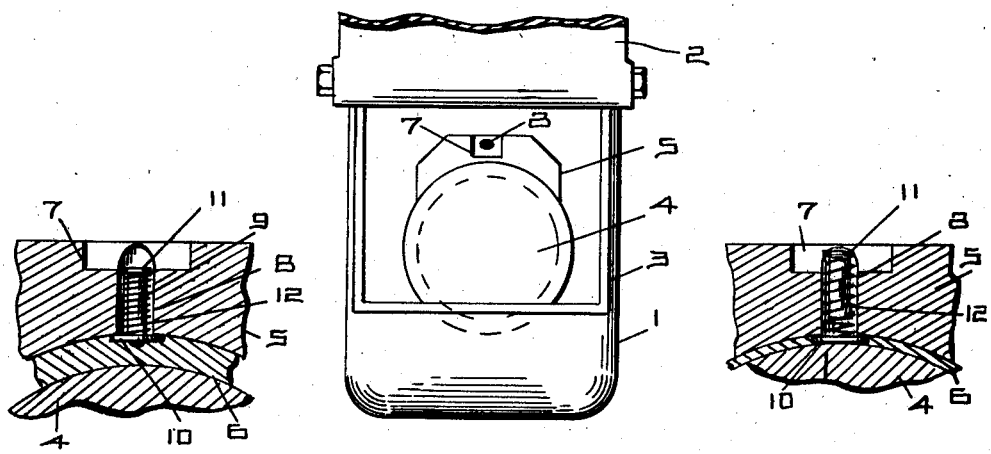
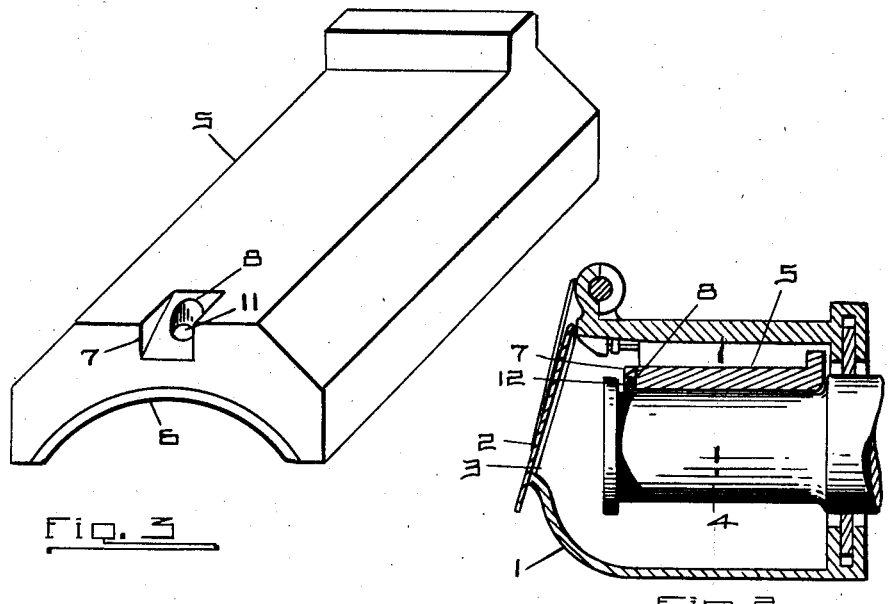

UNITED STATES PATENT OFFICE.

JOSEPH E. BLAIN, OF PITTSBURGH, PENNSYLVANIA; ESTELLA H. BLAIN, ADMINISTRATRIX OF SAID JOSEPH E. BLAIN, DECEASED, ASSIGNOR, BY DIRECT AND MESNE ASSIGNMENTS, OF ONE-HALF TO ESTELLA H. BLAIN, OF THOMPSON, PENNSYLVANIA, AND ONE-HALF TO RAY H. FITZGERALD, OF PITTSBURGH, PENNSYLVANIA.

BEARING-WEAR-SIGNAL DEVICE.

1,361,000.  Specification of Letters Patent.  Patented Dec. 7, 1920.

Application filed October 13, 1919. Serial No. 330,291.

*To all whom it may concern:*

Be it known that I, JOSEPH E. BLAIN, a citizen of the United States of America, residing at Pittsburgh, Allegheny county, Pennsylvania, have invented new and useful Bearing-Wear-Signal Devices, of which the following is a specification.

This invention relates to wear signal means for bearings, as wear metal lined bearing boxes.

This invention has utility when incorporated in soft metal lined bearing members or brasses, especially journal box brasses for railway cars.

Referring to the drawings:

Figure 1 is a fragmentary perspective view of an embodiment of the invention in connection with a railway car journal box brass;

Fig. 2 is a longitudinal section through the brass or bearing member of Fig. 1 in position on its journal;

Fig. 3 is a detail view in perspective of the brass with the tell tale or signal device incorporated therewith; Fig. 4 is an enlarged detail of the device set; and Fig. 5 is a detail of the device tripped.

A journal box 1 is shown as having a lid 2 for normally maintaining closed lubricant supplying and inspection opening 3. In this box 1 is disposed car wheel axle or journal 4 spaced from the upper side of the box 1 by a bearing member or brass 5 provided with a wear metal, Babbitt, or soft lining 6.

In a position for ready viewing or inspection through opening 3 when the lid 2 is open, the brass 5 has a recess 7 from which extends opening 8 to communicate with the lining 6. Loosely fitting in this opening 8 lining 6. Loosely fitting in this opening 8 is a tell tale device herein shown as a pin 9 of say copper anchored as to the lining 6. This anchoring may be effected by riveting the pin 9 to a washer 10, the washer being larger than the opening 8 and embedded in the lining 6.

The pin 9 is provided with a head 11 which may normally be urged upward away from the lining 6 by a helical spring 12 surrounding the pin 9.

In assembling the device of this disclosure, with such type of bearing members or brasses as may be desirable, the spring 12 is compressed to bring the pin 9 into the opening 8 and is so held by the washer 10 anchored in the wear metal lining 6. With this tell tale or signal device so assembled with the bearing member as a unitary structure it may be mounted in position in the journal box. The location of the washer 10 in the wear metal lining may be such that the release of the pin 9 occurs to give the visible signal in the recess 7 an appreciable wear period for the bearing lining 6 so that in the ordinary course of journal box inspection the journal 4 may not be scored by the member 5 wearing thereinto before the thinness of the lining is located.

In practice, the one making bearing inspection in regular course, at once upon opening the lid 2, may readily observe if the pin 9 has been snapped up into the recess 7. Should the pin be still retained in the opening 8, the inspector knows the brass lining is not dangerously worn. However, should the pin 9 be snapped up into the recess 7 by the spring 12, owing to the journal 4 having worn off the topper terminus of the pin which protruded through the washer 10, the inspector is apprised of the fact that the brass lining is worn thin and should be replaced without unreasonable delay, at the first opportunity in order to prevent damaging wear to the brass or journal.

What is claimed and it is desired to secure by Letters Patent is:

1. A wear metal lined bearing and a telltale device mounted in the bearing and releasable by definite wear of the lined bearing, said device comprising a member having a portion releasable by wear and a spring to throw the released member away from the wear released position.

2. A journal box, a journal therein, a bearing member for the journal, a soft metal lining for the member spacing the journal from the member, a tell tale releasable by wearing away of the soft metal to move relatively to the member, and a spring for shifting the tell tale away from wear released position.

3. A bearing brass, a wear metal lining therefor, there being a recess in the brass provided with an opening therefrom toward the lining, and a tell tale in the recess releasable by the lining wearing toward said opening.

4. A bearing brass having at its forward end a recess and an opening from said recess, a wear metal lining for the brass in communication with which lining said opening extends, and means extending into the opening to the lining and releasable by lining wear to move into the recess.

5. A bearing brass having a recess and an opening inward from said recess, a wear metal lining for the brass to which lining said opening extends, and a pin in the opening anchored in the lining to be released by lining wear to move into the recess.

6. A bearing brass having a recess and an opening therefrom, a wear metal lining for the brass in communication through said opening with the recess, a pin anchored by the lining to be held in the opening, and a spring urging the pin toward the recess for throwing the pin as released by lining wear into said recess.

7. A journal box provided with an inspection opening, a brass having a portion thereof visible from the opening, a lining of wear metal for the brass, a pin freely movable as to the brass anchored in the lining to be released by lining wear, and a spring for throwing the wear released pin into position for ready inspection from the box opening.

In witness whereof I affix my signature.

JOSEPH E. BLAIN.